(12) United States Patent
Bricker et al.

(10) Patent No.: US 6,859,161 B1
(45) Date of Patent: Feb. 22, 2005

(54) SYSTEM FOR TIME THRESHOLDING

(75) Inventors: Jeffrey K. Bricker, Apalachin, NY (US); Anthony J. Gounalis, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/658,502

(22) Filed: Sep. 9, 2003

(51) Int. Cl.$^7$ ............................................. G01S 7/285
(52) U.S. Cl. ........................... 342/13; 342/89; 342/91
(58) Field of Search ....................... 342/13, 14, 16–19, 342/88, 89, 91–93, 98, 99, 194, 195; 375/317, 340, 345; 455/232.1, 242.2, 334

(56) References Cited

U.S. PATENT DOCUMENTS

| | | | |
|---|---|---|---|
| 4,697,157 A | 9/1987 | Buddecke et al. ............ 331/78 |
| 5,239,555 A | 8/1993 | Konig ......................... 375/136 |
| 5,265,121 A | 11/1993 | Stewart ...................... 375/346 |
| 5,381,150 A | 1/1995 | Hawkins et al. .............. 342/13 |
| 5,689,274 A | 11/1997 | Rose .......................... 342/417 |
| 5,708,437 A | 1/1998 | Gellekink ................... 342/442 |
| 5,708,443 A | 1/1998 | Rose ........................... 342/91 |
| 5,901,172 A * | 5/1999 | Fontana et al. ............. 375/130 |
| 5,999,129 A | 12/1999 | Rose ......................... 342/394 |
| 6,020,842 A | 2/2000 | Lewis et al. .................. 342/13 |
| 6,163,297 A | 12/2000 | Rose ......................... 342/418 |
| 6,177,904 B1 * | 1/2001 | Coenen et al. ............... 342/62 |
| 6,184,826 B1 * | 2/2001 | Walley et al. .............. 342/360 |
| 6,313,620 B1 | 11/2001 | Richardson et al. ........ 342/424 |
| 6,313,781 B1 | 11/2001 | Lee ............................. 342/13 |
| 6,313,794 B1 | 11/2001 | Rose ........................ 324/76.31 |
| 6,366,236 B1 | 4/2002 | Farmer et al. .............. 342/195 |
| 6,388,604 B1 | 5/2002 | Lee .............................. 342/13 |
| 6,411,249 B1 | 6/2002 | Rose ........................... 342/13 |
| 6,674,397 B2 * | 1/2004 | Hager et al. ................ 342/159 |
| 6,680,691 B2 * | 1/2004 | Hager et al. ................ 342/127 |
| 6,734,820 B2 * | 5/2004 | Hager et al. ................ 342/194 |
| 6,738,563 B1 * | 5/2004 | Hager et al. ................ 342/147 |
| 6,741,947 B1 * | 5/2004 | Wichelman et al. ........ 702/122 |
| 6,785,540 B1 * | 8/2004 | Wichelman .................. 455/423 |
| 2004/0119631 A1 * | 6/2004 | Sanders et al. .............. 342/14 |
| 2004/0133380 A1 * | 7/2004 | Gounalis .................... 702/127 |
| 2004/0135717 A1 * | 7/2004 | Gounalis ..................... 342/13 |

OTHER PUBLICATIONS

"Acquisition time distribution for spread–spectrum receivers", Pan,S.M.;Dodds, D.E.; Kumar, S.;Selected Areas in Communications, IEEE Journal on, vol.: 8, Issue: 5, Jun. 1990 Ps:800–808.*

* cited by examiner

Primary Examiner—John B. Sotomayor
(74) Attorney, Agent, or Firm—Tarolli, Sundheim, Covell & Tummino L.L.P.

(57) ABSTRACT

A system time thresholds dwells executed by an electromagnetic signal receiver. The system includes a detection module and a processing module. The detection module receives electromagnetic signals from a surrounding environment. The electromagnetic signals are chronologically segregated into a plurality of dwells each with a dwell time. The processing module controls the scanning of the surrounding environment. The processing module sets dwell parameters and determines whether to skip the execution of particular dwells. The processing module receives data about the signals from the detection module.

8 Claims, 6 Drawing Sheets

SYSTEM FOR TIME THRESHOLDING

FEDERAL SPONSORSHIP

The U.S. Government has a paid-up license in this invention and the right, in limited circumstances, to require the patent owner to license others on reasonable terms as provided for by the terms of Contract No. N00019-97-C-0147 awarded by the U.S. Navy.

FIELD OF INVENTION

The present invention relates to a system for signal processing and, more specifically, a system for time thresholding.

BACKGROUND OF THE INVENTION

Typically, transmitted signals are collected by a receiver and processed during predetermined time intervals called dwells. The processing of signals received during a previous dwell occurs during a subsequent dwell. An inter-dwell period exists between dwells to allow for the reconfiguration of data processing circuits and other hardware in response to the processed data of the most recent dwell. Any processing of received signals or collecting of received signals is typically halted during this inter-dwell period.

A system may transmit or receive signals within a predetermined frequency band (i.e., channel, etc.). However, radio frequency interference may corrupt the channel and make the channel unusable. The system may determine whether the channel is corrupted with radio frequency interference (RFI) after processing received signals. If the channel is corrupted with RFI, commands may be generated to assign the system to the incrementally next channel upon completion of the current dwell. However, if the next channel is also corrupted with RFI, the system cannot make the determination until the completion of the next dwell. If several corrupted channels are assigned to the system in sequence, valuable time is lost.

Hence, a need exists in the art for a system that more efficiently handles dwell execution in the presence of RFI without requiring the use of additional dwells. Electronic intelligence (ELINT) and electronic support measure (ESM) receiver systems are designed to intercept non-cooperative signals of interest. Since the signals are non-cooperative, the receiver system must analyze all detected signals present in an environment to discriminate signals of interest from environmental noise and incidental background signals. This imposes computational and throughput burdens on a receiver system and may slow signal intercept performance in the presence of RFI. A need exists to reduce the affects of the processing burden on a receiver and improve receiver intercept performance in the presence of significant environmental background energy.

SUMMARY OF THE INVENTION

A system in accordance with the present invention time thresholds dwells executed by an electromagnetic signal receiver. The system includes a detection module and a processing module. The detection module receives electromagnetic signals from a surrounding environment. The electromagnetic signals are chronologically segregated into a plurality of dwells each with a dwell time. The processing module controls the scanning of the surrounding environment. The processing module sets dwell parameters and determines whether to skip the execution of particular dwells. The processing module receives data about the signals from the detection module.

A computer program product in accordance with the present invention time thresholds dwells executed by an electromagnetic signal receiver. The product includes: a first instruction for receiving electromagnetic signals from a surrounding environment; a second instruction for creating data from the electromagnetic signals; a third instruction for chronologically segregating the electromagnetic signals into a plurality of dwells each with a dwell time; a fourth instruction for controlling the scanning of the surrounding environment; a fifth instruction for setting dwell parameters; and a sixth instruction for determining whether to skip the execution of particular dwells.

A method in accordance with the present invention time thresholds dwells executed by an electromagnetic signal receiver. The method includes the steps of: receiving electromagnetic signals from a surrounding environment; creating data from the electromagnetic signals; chronologically segregating the electromagnetic signals into a plurality of dwells each with a dwell time; controlling the scanning of the surrounding environment; setting dwell parameters; and determining whether to skip the execution of particular dwells.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF THE PREFERRED EMBODIMENT

Electronic support measure (ESM) receiver systems typically are ground based, airborne, or sea based (surface or sub-surface platforms) systems that passively detect threat signals of interest, typically radar and communication signals. An ESM system identifies, classifies, and prioritizes detected signals for display to an operator or crew. The goal is to provide the crew with a tactical picture, or "situational awareness", of the electromagnetic environment around them, such that the crew may react and counter any threats (e.g., maneuver, apply counter measure, attack, etc.). Since signal detection is passive (only receiving), an ESM receiver cannot be detected (i.e., an operator of a threat does not know that the ESM is in operation or that the threat has been detected, identified, and possibly located, etc.).

Figure 1:
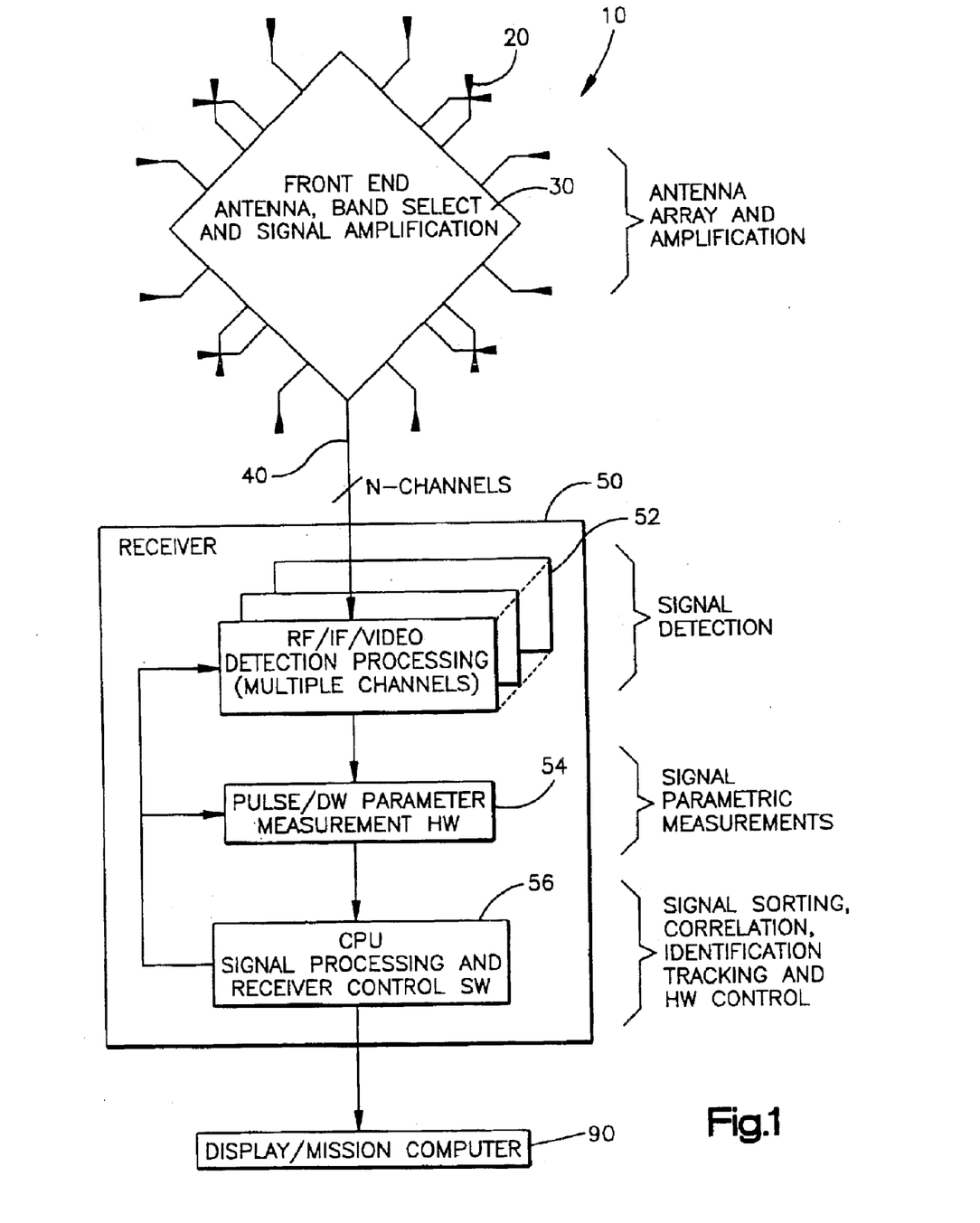
FIG. 1 is a schematic representation of an example system for use with the present invention.

Although there are many variations, a typical ESM receiver system 10, as seen in FIG. 1, consists of an antenna array 20, low noise preamplifier 30, antenna cables 40, a receiver 50, and display 90. The antenna array 20 is arranged to provide a 360 degree field of view and direction of arrival information. In some applications, a rotating "dish" antenna may be used.

The receiver 50 may typically be a super-heterodyne receiver with one or more channels switched among the antenna array inputs. The receiver 50 may include a detection module 52 and a signal parametric measurement module 54 (i.e., angle of arrival, frequency, modulation, etc.). The receiver 50 may also include one or more CPUs 56 that are tasked with running software for controlling how the electromagnetic environment is scanned for signal detection and for identifying, prioritizing, and tracking detected signals. Signal detection, or "emitter reports", are then provided directly to the display 90 or are reported to a computer for post-processing and further display.

Some applications of ESM receivers may include selfprotection, surveillance, and strike package support. Self-protection receivers are typically referred to as Radar Warning Receivers (RWR). The goal of RWR systems is to detect radar signals that control weapons and may harm the vehicle and crew. RWR's require very rapid detection times to allow the crew as much time as possible to counter or evade a threat.

Surveillance receivers provide a tactical picture of the electromagnetic environment. The goal is to determine the classification, bearing, and location of all signals within a region of interest. This may include passive tracking of commercial shipping, or the passive detection and location of hostile submarines. Electronic Intelligence (ELINT) collection is a somewhat more dangerous variation of surveillance.

For strike package support, enemy air defenses may be countered with airborne jammers, which react and focus the jammer power at the signals detected by the ESM receiver. This "Electronic Attack" degrades performance of the detected defenses such that strike aircraft may complete their mission and return safely.

As stated above, software is responsible for detecting, identifying, and reporting signals, as well as for controlling the scan of the electromagnetic environment. Scanning the environment requires that the receiver hardware be periodically commanded to "look" in the appropriate frequency band(s) for a period of time consistent with the signal of interest characteristics expected within the band. This is referred to as a "dwell". There may be one or more dwells, depending on the application and signal of interest characteristics. For example, the RWR function typically looks for a limited set of signals, and can often be configured to "stare" in a particular frequency band.

In contrast, the surveillance function may require a broad frequency range to be scanned, requiring many dwells with different dwell characteristics to satisfy a diverse set of signal parameters. These dwells may have different "look rates" or "revisit times", as well as dwell durations. Also, the dwell duration may consist of the minimum sample time and an extended time for data collection. The extended time cannot be predicted since the extended time is variable and driven by environmental detections. Thus, the time to perform the scan is highly variable.

Measuring the time to complete a scan cycle divided by an "ideal" cycle time is referred to as "Receiver Utilization" and provides an important output to the operator. The operator will infer "system health" based on this parameter. A large value implies that the receiver is bogging down, and that the scan strategy may need to be modified. A small value implies that rapid detection times are likely.

Figure 2:
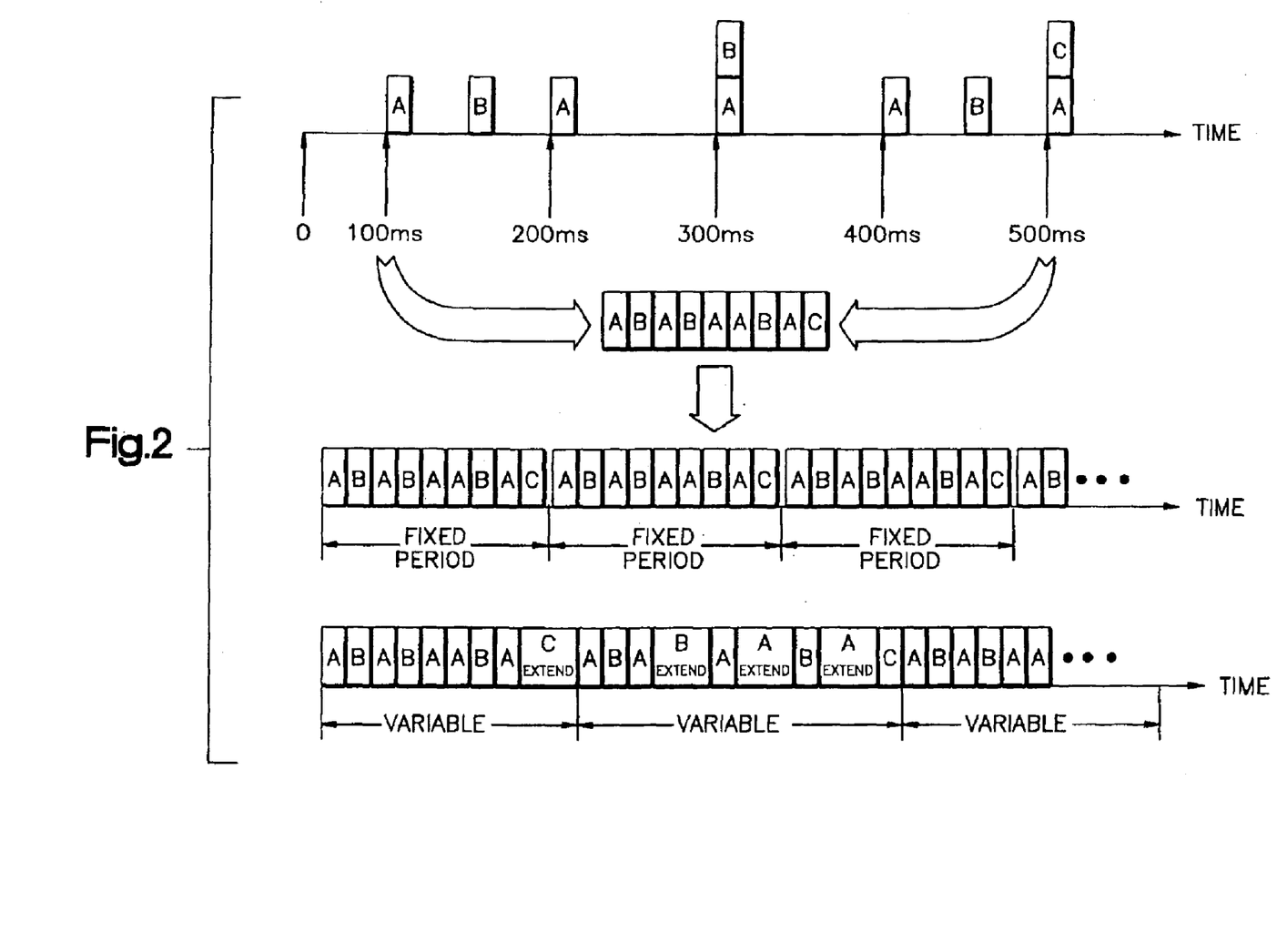
FIG. 2 is a schematic representation of an example system for use with the present invention.

The hardware configuration of a receiver system may also be varied to optimize detection (i.e., matched filtering, etc.). Given a set of dwells, the software is tasked with generating the dwell sequence and commanding the hardware for each dwell. If the set of dwells has the same revisit time, then the control software simply steps through the sequence. For example, if the receiver is given 3 dwells A, B, and C with the same revisit time, then the execution order would be ABCABCABCABC. If the dwells have different revisit times, then the execution order is driven by the relative revisit times, as seen in FIG. 2.

A pseudo-random dwell sequence of ABABAABAC is generated. For scan strategies consisting of tens or hundreds of unique dwells, the dwell sequence may lengthen dramatically. Note that regardless of the length, the minimum time to traverse the sequence is the sum of the dwell durations of the sequence, and that the end of the sequence is always indicated by the execution of the "slowest" dwell (dwell C in the example of FIG. 2).

Figure 3:
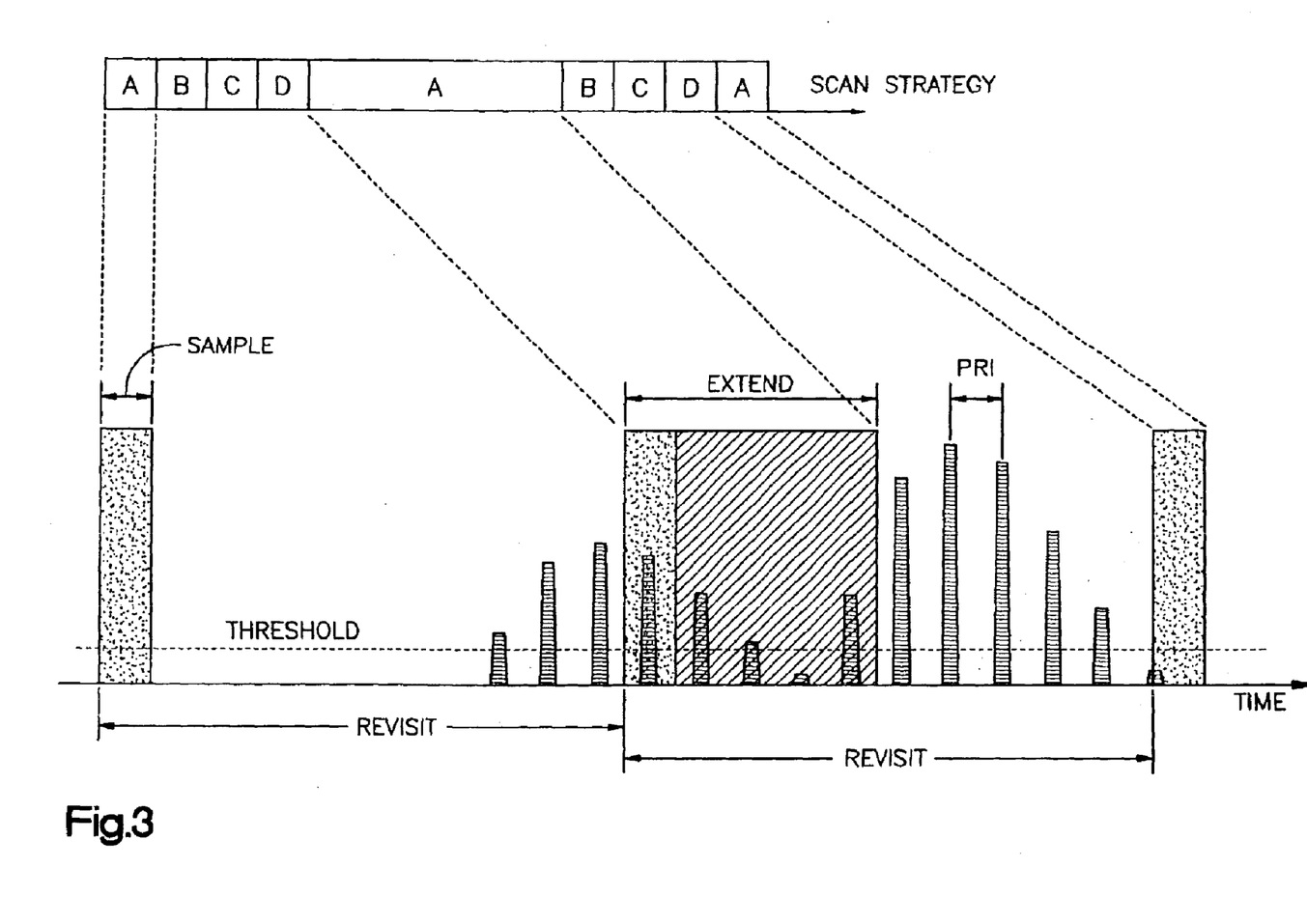
FIG. 3 is a schematic representation of an example system for use with the present invention.

The dwell duration may consist of the minimum sample time and an extend time for data collection (see FIG. 3). Since the extend time is variable and driven by environment detections, it cannot be predicted. This means that the time to perform the scan is highly variable. This is shown by the third "trace" of FIG. 2. Comparing the ratio of the Variable Period to the Fixed Period yields a measurement that indicates how successful the receiver is in meeting the desired dwell rates. As stated above, measuring the time to complete the scan cycle (Variable Period) divided by an "ideal" cycle time (Fixed Period) is referred to as "Receiver Utilization" and provides an important input to the operator. The operator will infer "system health" based on this parameter. A large value (greater than 1.0) implies that the receiver is bogging down, and that the scan strategy may need to be modified. A small value (1.0 or less) implies that rapid detection times are likely.

Although Receiver Utilization is variable, a predetermined upper bound may be assigned for each dwell. If a dwell consistently exceeds the predetermined value, the dwell may be identified and an automatic adjustment of the revisit time may be made.

When Receiver Utilization increases, it is primarily due to dwell durations holding the dwells "open" for longer than expected. Using dwell A as an example, it is expected that most executions of dwell A will simply last for the Sample Time, which is the minimum period of time the receiver is required to wait for the detection of a signal of interest. If such a signal is detected, then the dwell time may be extended to collect information on the signal. There are three outcomes after this minimum dwell duration: 1) a new signal is detected; 2) a signal already under track is re-detected; or 3) a signal already under track is re-detected and is due for an update. In typical operation, the receiver is expected to acquire the environment (new signals) quickly and place it under track, such that in the steady state, most dwell executions last for the Sample Time, with "sporadic" Extend Times induced to update tracks or characterize new signals.

Unfortunately, there are conditions for which the assumption of sporadic or infrequent Extend Times is not true. Of particular interest is the situation in which the receiver detects noise or noise like signals during the Sample Time, but cannot establish a track on the noise, such that each Sample Time also invokes an Extend Time on nearly every dwell execution. If the Revisit Time is also small, then the receiver is spending significantly more time on the "noisy" dwells that the scan strategy planned. If the desired signal is distinguishable from the background noise, then the extra time consumed by this dwell boosts the probability of intercept (POI) for the dwell's desired signal, but with a low POI of emitters detected by other dwells.

Figure 4:
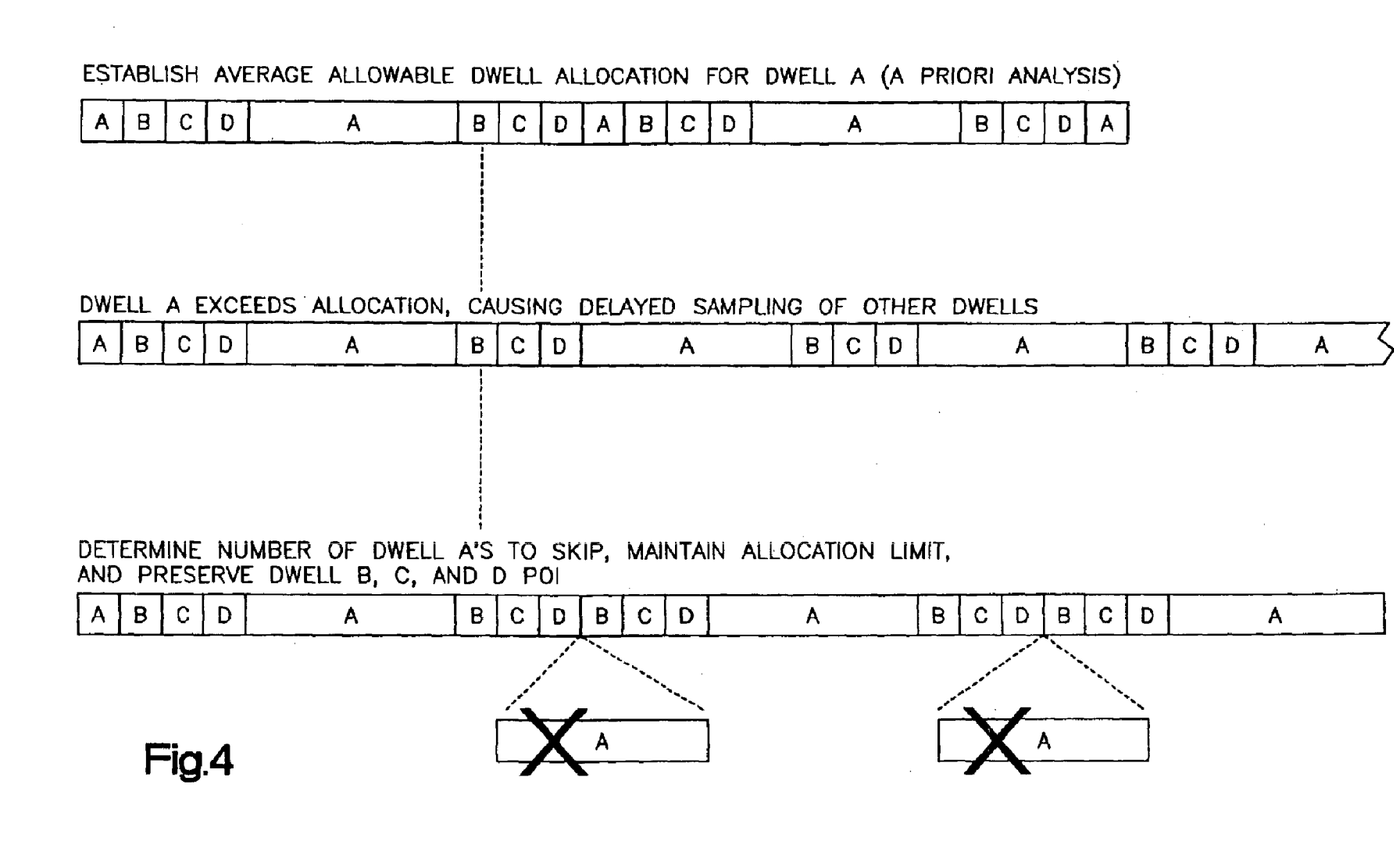
FIG. 4 is a schematic representation of an example system in accordance with the present invention.

Although the environment will drive the achieved dwell duration, the dwell duration value may be compared to a modeled allowable value, and may be tracked relative to that model. If the dwell's behavior differs from the model, the difference may be identified. Also, at the single dwell level, the individual dwell's contribution to overall Receiver Utilization may be expressed as the dwell's achieved dwell duration divided by its revisit time. Therefore, if a dwell is exceeding its modeled dwell duration ("Time Threshold"), its revisit time may be extended to maintain a more constant contribution to the overall Receiver Utilization. Rather than actually changing Revisit Time directly, the desired extended revisit time may be achieved by determining the number of "normal" executions that are to be skipped, as seen in FIG. 4. Once the excessive load is removed, the revisit rate is restored.

The skipping of dwells need not be applied to all dwells, but may be applied only to a subset for which such interference is anticipated. In addition, of these dwells, the skipping may be limited to the subset of dwells for which Extend Time is a significant percentage of Revisit Time (i.e., small Revisit Time dwells). The dwell duration model may take on a variety of forms, such as assuming sample "looks" every dwell execution, and sample "looks" plus an Extend Collection every 2 sec.

As stated above, ELINT and ESM receivers in accordance with the present invention employ a scan strategy to scan the frequency spectrum for signals of interest. This scan strategy is comprised of a set of dwells, which define for how long energy is sampled in a portion of this frequency spectrum, and how often that portion of the frequency spectrum should be sampled. These properties are referred to as dwell duration and dwell revisit time (RVT), respectively. Dwell duration may be further subdivided into two time intervals, minimum dwell duration (MDT) and extended dwell duration (EDT).

MDT defines the minimum amount of time spent for a given dwell, while EDT defines the maximum amount of time. The actual time spent (actual dwell duration) may range between these two limits, based on the signal density in the sampled portion of the spectrum.

The ratio of actual dwell duration divided by RVT provides a measure of how much of the receiver is being utilized in a given portion of the frequency spectrum. If this ratio exceeds a predetermined design threshold, then too much of the receiver time is being utilized dwelling in what may be a limited portion of the frequency spectrum.

To reduce the ratio, RVT may be temporarily increased to allow the long term average to meet a predetermined design ratio, thus reducing the workload by reducing the sampling rate. A system in accordance with the present invention provides a means for regulating each dwell's RVT between desired limits to reduce excessive workload. The system may further provide controls for actuating the system on a per dwell basis.

Figure 5:
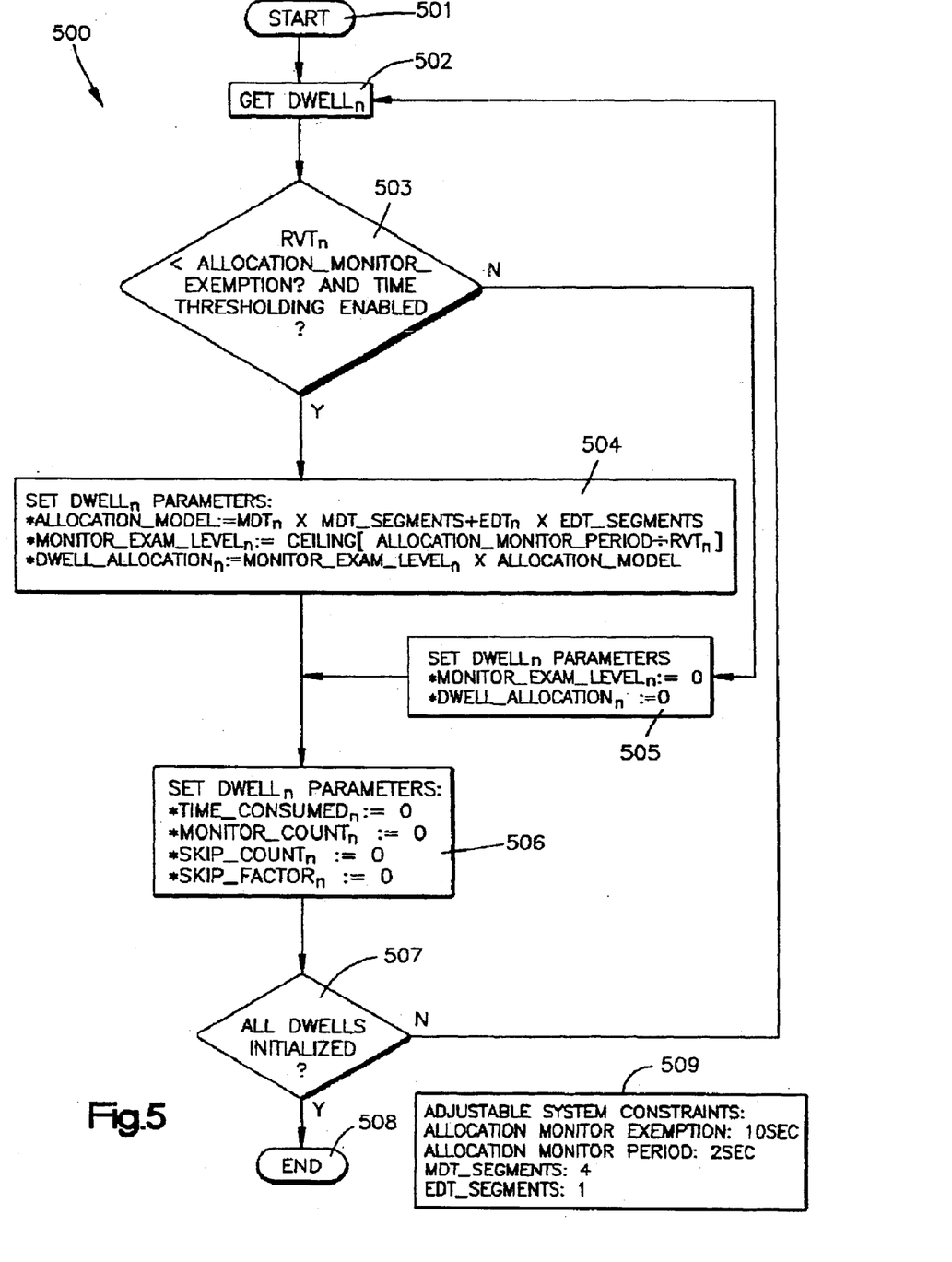
FIG. 5 is a schematic representation of an example system in accordance with the present invention.

FIG. 5 illustrates an example initialization algorithm for use with a system 500 in accordance with the present invention. In step 501, the system 500 begins the algorithm. Following step 501, the system 500 proceeds to step 502. In step 502, the system 500 gets the nth dwell. Following step 502, the system 500 proceeds to step 503. In step 503, the system 500 determines whether Revisit Time (RVT) of the nth dwell is less than Allocation_Monitor_Exemption and whether time thresholding should be enabled. If Revisit Time is not less than Allocation_Monitor_Exemption, the system 500 proceeds to step 505. In step 505, the system 500 sets parameters of the nth dwell. The system 500 sets Monitor_Exam_Level to zero and Dwell_Allocation to zero. Following step 505, the system 500 proceeds to step 506.

If Revisit Time of the nth dwell is less than Allocation_Monitor_Exemption, time thresholding is enabled and the system 500 proceeds to step 504. In step 504, the system 500 sets the parameters of the nth dwell. The system 500 sets Allocation_Model to minimum dwell duration (MDT) multiplied by MDT_Segments plus extended dwell duration (EDT) multiplied by EDT_Segments. The system 500 sets Monitor_Exam_Level to the ceiling of Allocation_Monitor period divided by RVT. The system 500 sets Dwell_Allocation to Monitor_Exam_Level multiplied by Allocation_Model. Following step 504, the system 500 proceeds to step 506.

In step 506, the system 500 sets Time_Consumed, Monitor_Count, Skip_Count, and Skip_Factor to zero. Following step 506, the system 500 proceeds to step 507. In step 507, the system 500 determines whether all dwells have been initialized. If all dwells have not been initialized, the system 500 proceeds back to step 502.

If all dwells have been initialized, the system 500 proceeds to step 508. In step 508, the system 500 ends the example algorithm. Box 509 of FIG. 5 lists several example adjustable system constants.

Figure 6:
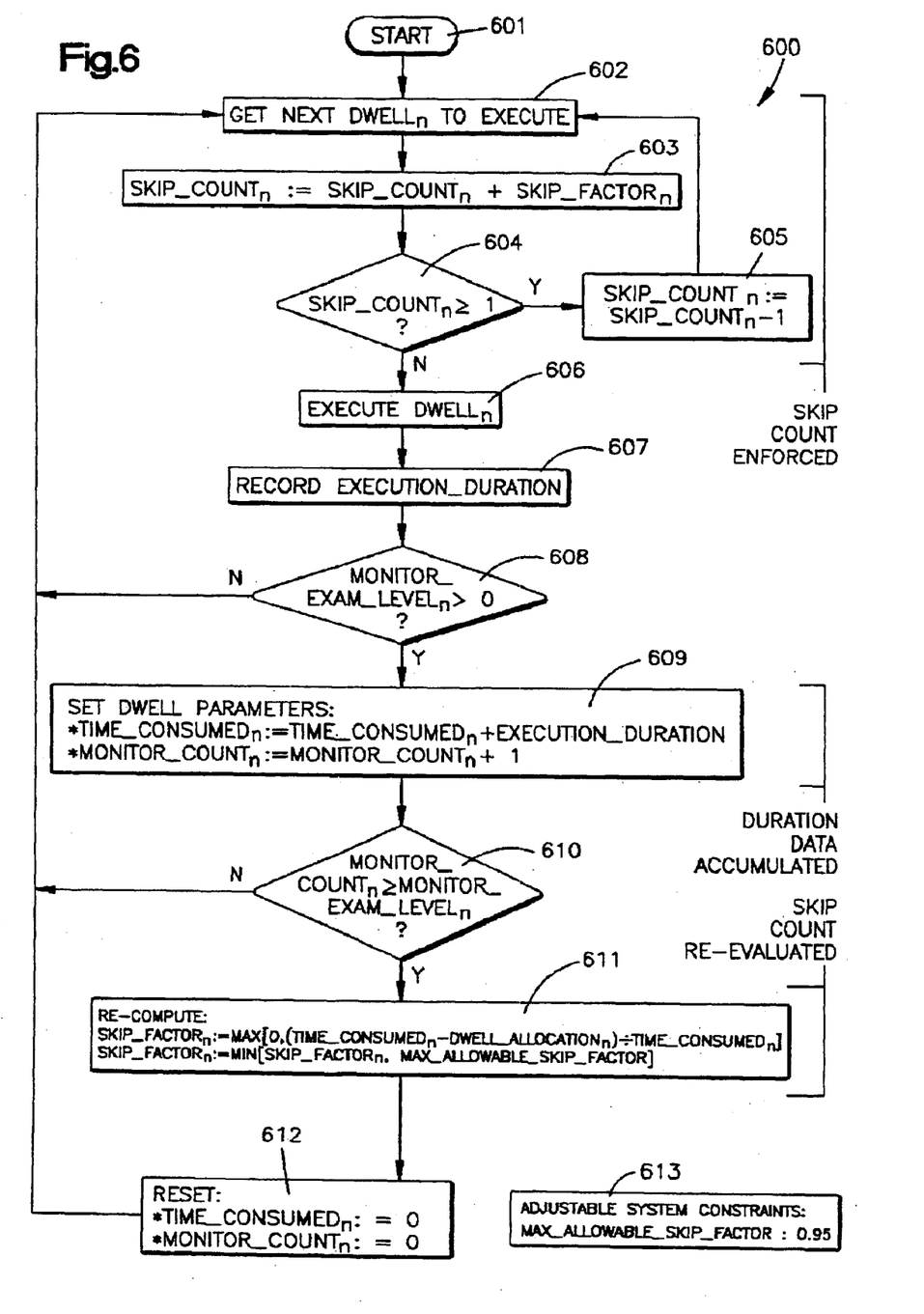
FIG. 6 is a schematic representation of an example system in accordance with the present invention.

FIG. 6 illustrates an example processing algorithm for use with a system 600 in accordance with the present invention. In step 601, the system 600 begins the algorithm. Following step 601, the system 600 proceeds to step 602. In step 602, the system 600 gets the next dwell N. Following step 602, the system 600 proceeds to step 603. In step 603, the system 600 sets Skip_Count of dwell N to Skip_Count of dwell N plus Skip_Factor of dwell N. Following step 603, the system 600 proceeds to step 604.

In step 604, the system 600 determines if Skip_Count is greater than or equal to one. If Skip_Count is greater than or equal to one, the system 600 proceeds to step 605. In step 605, the system 600 sets Skip_Count to Skip_Count minus one. Following step 605, the system 600 proceeds back to step 602.

If Skip_Count is not greater than of equal to one, the system 600 proceeds to step 606. In step 606, the system 600 executes dwell N. Following step 606, the system 600 proceeds to step 607. In step 607, the system 600 records Execution_Duration. Following step 607, the system 600 proceeds to step 608. In step 608, the system 600 determines whether Monitor_Exam_Level is greater than zero.

If Monitor_Exam_Level is not greater than zero, the system 600 proceeds back to step 602. If Monitor_Exam_Level is greater than zero, the system 600 proceeds to step 609. In step 609, the system 600 sets dwell parameters. The system 600 sets Time_Consumed to Time_Consumed plus Execution_Duration. The system 600 sets Monitor_Count to Monitor_Count plus one. Following step 606, the system 600 proceeds to step 607. Following step 609, the system 600 proceeds to step 610. In step 610, the system 600 determines whether Monitor_Count is greater than or equal to Monitor_Exam_Level.

If Monitor_Count is not greater than or equal to Monitor_Exam_Level, the system 600 proceeds back to step 602. If Monitor_Count is greater than or equal to Monitor_Exam_Level, the system proceeds to step 611.

In step 611, the system 600 recomputes Skip_Factor to the maximum zero or Time_Consumed minus Dwell_Allocation divided by Time_Consumed. In step 611, the system 600 also recomputes Skip_Factor to the minimum of Skip_Factor or Max_Allowable_Skip_Factor.

Following step 611, the system 612 proceeds to step 612. In step 612, the system 600 resets Time_Consumed to zero and Monitor_Count to zero. Box 613 of FIG. 6 lists several example adjustable system constants.

The problem of environmental noise/interference is conventionally addressed via environmental CFAR, which is a power amplitude thresholding process. CFAR is difficult to make work with non-cooperative signals, and is therefore not typically applied to ELINT or ESM receiver systems. A more common solution is to lock dwell detection thresholds at predetermined values, sacrificing receiver sensitivity.

Amplitude Thresholding/CFAR may even render signal detection impossible, if the threshold is raised too high. In contrast, a system in accordance with the present invention may only delay interception in an overloaded frequency band. In conventional systems, interference may penalize the total scan strategy by delaying the entire spectrum scan. In addition, a system in accordance with the present invention may respond to total workload, while CFAR responds only to what is perceived as noise.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A computer program product for time thresholding dwells executed by an electromagnetic signal receiver, said product comprising:

a first instruction for receiving electromagnetic signals from a surrounding environment;

a second instruction for creating data from the electromagnetic signals;

a third instruction for chronologically segregating the electromagnetic signals into a plurality of dwells each with a dwell time;

a fourth instruction for controlling the scanning of the surrounding environment;

a fifth instruction for setting dwell parameters; and a sixth instruction for determining whether to skip the execution of particular dwells exceeding a time threshold.

2. The computer program product as set forth in claim 1 further comprising an instruction for determining whether a revisit time of a dwell is less than a predetermined allocation monitor exemption time.

3. The computer program product as set forth in claim 1 further comprising an instruction for determining each dwell time by subtracting a start time from a clock time.

4. The computer program product as set forth in claim 1 further comprising an instruction for conducting further processing of data obtained from said fifth and sixth instruction.

5. The computer program product as set forth in claim 1 wherein said fourth instruction includes the issuing of commands to a receiver for varying the frequency of the electromagnetic signals received from the surrounding environment.

6. A system for time thresholding dwells executed by an electromagnetic signal receiver, said system comprising:

a detection module for receiving electromagnetic signals from a surrounding environment, the electromagnetic signals being chronologically segregated into a plurality of dwells each with a dwell time;

a processing module for controlling the scanning of the surrounding environment, said processing module setting dwell parameters and determining whether to skip the execution of particular dwells exceeding a time threshold, said processing module receiving data about the signals from said detection module.

7. A method for time thresholding dwells executed by an electromagnetic signal receiver, said method comprising the steps of:

receiving electromagnetic signals from a surrounding environment;

creating data from the electromagnetic signals;

chronologically segregating the electromagnetic signals into a plurality of dwells each with a dwell time;

controlling the scanning of the surrounding environment;

setting dwell parameters; and determining whether to skip the execution of particular dwells exceeding a time threshold.

8. The method as set forth in claim 7 further comprising the step of determining each dwell time by subtracting a temporarily fixed start time from a clock time.

\* \* \* \* \*